United States Patent
Lee et al.

(10) Patent No.: US 10,620,357 B2
(45) Date of Patent: Apr. 14, 2020

(54) BACKLIGHT UNIT INCLUDING INPUT COUPLER, HOLOGRAPHIC DISPLAY APPARATUS INCLUDING THE BACKLIGHT UNIT, AND METHOD OF MANUFACTURING THE INPUT COUPLER

(71) Applicant: SAMSUNG ELECTRONICS CO., LTD., Suwon-si (KR)

(72) Inventors: Sunghoon Lee, Seoul (KR); Hoon Song, Yongin-si (KR); Jungkwuen An, Suwon-si (KR); Sunil Kim, Seoul (KR); Chilsung Choi, Suwon-si (KR); Young Kim, Yongin-si (KR); Kanghee Won, Seoul (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 154 days.

(21) Appl. No.: 15/894,370

(22) Filed: Feb. 12, 2018

(65) Prior Publication Data
US 2019/0064420 A1    Feb. 28, 2019

(30) Foreign Application Priority Data

Aug. 30, 2017 (KR) .................. 10-2017-0110345

(51) Int. Cl.
*F21V 8/00* (2006.01)
*G02B 27/22* (2018.01)
(Continued)

(52) U.S. Cl.
CPC ......... *G02B 6/0016* (2013.01); *G02B 6/0038* (2013.01); *G02B 6/0065* (2013.01);
(Continued)

(58) Field of Classification Search
None
See application file for complete search history.

(56) References Cited

U.S. PATENT DOCUMENTS 5,116,461 A * 5/1992 Lebby ............... G02B 5/1857
                                                       204/192.34
8,798,415 B2   8/2014 Mizuyama
(Continued)

FOREIGN PATENT DOCUMENTS

JP    2003-215318 A    7/2003
JP    2015-049376 A    3/2015
KR    10-2018-0012058 A    2/2018

OTHER PUBLICATIONS

Communication dated Dec. 13, 2018, issued by the European Patent Office in counterpart European Application No. 18169044.7.

*Primary Examiner* — Jennifer D. Carruth
(74) *Attorney, Agent, or Firm* — Sughrue Mion, PLLC (57) ABSTRACT

A backlight unit including an input coupler, a holographic display apparatus including the backlight unit, and a method of manufacturing the input coupler are provided. The backlight unit includes the input coupler configured to cause light incident on a light incident surface of a light guide plate to travel into the light guide plate, the input coupler has a binary grating structure in which a plurality of barriers are arranged parallel to one another at a constant grating period, and the plurality of barriers are tilted from the light incident on the light incident surface.

17 Claims, 8 Drawing Sheets

(51) Int. Cl.
*G03H 1/22* (2006.01)
*G02B 5/18* (2006.01)

(52) U.S. Cl.
CPC ....... *G02B 6/0068* (2013.01); *G02B 27/2214* (2013.01); *G03H 1/2294* (2013.01); *G02B 5/18* (2013.01); *G02B 6/003* (2013.01); *G02B 6/0031* (2013.01); *G03H 2223/16* (2013.01)

(56) References Cited

U.S. PATENT DOCUMENTS

| | | |
|---|---|---|
| 2004/0062502 A1 | 4/2004 | Levola |
| 2010/0079865 A1 | 4/2010 | Saarikko et al. |
| 2010/0142892 A1 | 6/2010 | Kuittinen et al. |
| 2010/0214659 A1 | 8/2010 | Levola |
| 2011/0096401 A1 | 4/2011 | Levola |
| 2015/0177591 A1 | 6/2015 | Sugiyama et al. |
| 2016/0147003 A1 | 5/2016 | Morozov et al. |
| 2016/0231568 A1 | 8/2016 | Saarikko et al. |
| 2017/0235219 A1 | 8/2017 | Kostamo |
| 2018/0032030 A1 | 2/2018 | Kim et al. |

\* cited by examiner

BACKLIGHT UNIT INCLUDING INPUT COUPLER, HOLOGRAPHIC DISPLAY APPARATUS INCLUDING THE BACKLIGHT UNIT, AND METHOD OF MANUFACTURING THE INPUT COUPLER

CROSS-REFERENCE TO RELATED APPLICATION

This application claims the priority from Korean Patent Application No. 10-2017-0110345, filed on Aug. 30, 2017 in the Korean Intellectual Property Office, the disclosure of which is incorporated herein in its entirety by reference.

BACKGROUND

1. Field

Example embodiments of the present disclosure relate to a backlight unit including an input coupler, a holographic display apparatus including the backlight unit, and a method of manufacturing the input coupler, and more particularly, to a backlight unit for suppressing a stripe pattern of illumination light by using an input coupler having a tilted grating structure, a holographic display apparatus including the backlight unit, and a method of manufacturing the input coupler having the tilted grating structure.

2. Description of the Related Art

A glasses type method and a non-glasses type method are widely used as methods of forming three-dimensional (3D) images. Examples of the glasses type method include a polarized glasses type method and a shutter glasses type method, and examples of the non-glasses type method include a lenticular method and a parallax barrier method. Such methods using binocular parallax have problems in that it is difficult to increase the number of viewpoints and viewers may feel tired due to a difference between depth perceived by the brain and the focus of eyes.

As 3D image display methods for making depth perceived by the brain consistent with the focus of the eyes and providing full parallax, holographic display methods have been gradually put to practical use. Holographic display methods reproduce an image of an original object by irradiating reference light onto a hologram pattern on which an interference pattern obtained by interference between object light reflected from the original object and the reference light is recorded and diffracting the reference light. Recently, backlight units using light guide plates have been used to reduce the volumes of optical systems in holographic display apparatuses.

SUMMARY

One or more example embodiments provide a backlight unit for suppressing a stripe pattern of illumination light by using an input coupler having a tilted grating structure.

One or more example embodiments also provide a holographic display apparatus including the backlight unit.

One or more example embodiments also provide a method of manufacturing the input coupler having the tilted grating structure According to an aspect of an example embodiment, there is provided a backlight unit including a light source configured to generate light, a light guide plate including a light incident surface on which the light generated by the light source is incident and a light emission surface through which the light incident on the light incident surface of the light guide plate is emitted, an input coupler configured to cause the light incident on the light incident surface of the light guide plate to travel into the light guide plate, and an output coupler configured to emit the light traveling in the light guide plate outward through the light emission surface of the light guide plate, wherein the input coupler includes a binary grating structure in which a plurality of barriers that are arranged parallel to one another at a constant grating period, and the plurality of barriers are tilted from a direction of the light incident on the light incident surface of the light guide plate.

The input coupler may be further configured to cause light perpendicularly incident on the input coupler to be diffracted and to obliquely travel with respect to the input coupler, and to cause light obliquely incident on the input coupler to be diffracted and to travel in one of a direction perpendicular to the input coupler or a direction opposite to a direction in which light travels in the light guide plate.

The light guide plate may further include a first surface and a second surface that is opposite to the first surface, and the input coupler may be provided on an edge portion of the first surface of the light guide plate and may be further configured to diffract the light incident on the input coupler to obliquely travel to the second surface of the light guide plate.

The light may include light having a first wavelength band and light having a second wavelength band that is shorter than the first wavelength band, and wherein the constant grating period of the input coupler may be set so the light having the first wavelength band that is diffracted by the input coupler is incident on the second surface of the light guide plate, is totally reflected by the second surface of the light guide plate, and travels to the first surface of the light guide plate and is not incident again on the input coupler.

The constant grating period of the input coupler may be set so a portion of the light having the second wavelength band that is diffracted by the input coupler is incident on the second surface of the light guide plate, is totally reflected by the second surface of the light guide plate, and travels to the first surface of the light guide plate and is incident again on the input coupler.

The output coupler may be provided adjacent to the input coupler on the first surface of the light guide plate.

The output coupler may be provided on the second surface of the light guide plate.

The backlight unit may further include a collimating lens configured to collimate the light that is emitted from the light source and is incident on the input coupler into parallel light.

The backlight unit may further include a reflective layer provided on the input coupler.

According to an aspect of another example embodiment, there is provided a holographic display apparatus including a backlight unit, and a spatial light modulator configured to modulate light provided by the backlight unit and form a holographic image, wherein the backlight unit includes a light source configured to generate the light, a light guide plate including a light incident surface on which the light generated by the light source is incident and a light emission surface through which the incident light is emitted, an input coupler configured to cause the light incident on the light incident surface of the light guide plate to travel into the light guide plate, and an output coupler configured to emit the light incident on the light traveling in the light guide plate outward through the light emission surface of the light guide plate, wherein the input coupler has a binary grating structure in which a plurality of barriers that are arranged parallel to one another at a constant grating period, and the plurality of barriers are tilted from a direction of the light incident on the light incident surface of the light guide plate.

The input coupler may be further configured to cause light perpendicularly incident on the input coupler to be diffracted and to obliquely travel with respect to the input coupler, and to cause light obliquely incident on the input coupler to be diffracted and to travel in one of a direction perpendicular to the input coupler or a direction opposite to a direction in which light travels in the light guide plate.

The light guide plate may further include a first surface and a second surface that is opposite to the first, and the input coupler may be located on an edge portion of the first surface of the light guide plate and may be further configured to diffract the light incident on the input coupler to obliquely travel to the second surface of the light guide plate.

The light may include light having a first wavelength band and light having a second wavelength band that is shorter than the first wavelength band, and wherein the constant grating period of the input coupler may be set so the light having the first wavelength band that is diffracted by the input coupler is incident on the second surface of the light guide plate, is totally reflected by the second surface of the light guide plate, and travels to the first surface of the light guide plate and is not incident again on the input coupler.

The constant grating period of the input coupler may be set so a portion of the light having the second wavelength band that is diffracted by the input coupler is incident on the second surface of the light guide plate, is totally reflected by the second surface of the light guide plate, and travels to the first surface of the light guide plate and is incident again on the input coupler.

The output coupler may be provided adjacent to the input coupler on the first surface of the light guide plate.

The backlight unit may further include a reflective layer provided on the input coupler.

According to an aspect of another example embodiment, there is provided a method of manufacturing an input coupler, the method including preparing a plurality of elastic barriers that are parallel to one another and are perpendicularly provided on a first substrate, temporarily adhering the plurality of elastic barriers to a second substrate, filling a thermosetting or photocurable resin between the plurality of elastic barriers provided between the first substrate and the second substrate, tilting the plurality of elastic barriers by displacing the first substrate and the second substrate with respect to each other, forming a resin layer by curing the thermosetting or photocurable resin by applying heat or light to the thermosetting or photocurable resin, manufacturing a master mold including the second substrate and the resin layer by removing the first substrate and the plurality of elastic barriers, and replicating the input coupler by using the master mold, wherein the input coupler includes a binary grating structure in which a plurality of tilted barriers that are arranged parallel to one another at a constant grating period.

The temporary adhering of the plurality of elastic barriers to the second substrate may include performing oxygen ($O_2$) plasma surface treatment on a surface of the second substrate, and adhering the plurality of elastic barriers to be in contact with the $O_2$ plasma surface-treated surface of the second substrate.

The method wherein each of the plurality of elastic barriers may be oriented in a first direction, and wherein the displacing of the first substrate and the second substrate with respect to each other includes moving the first substrate or the second substrate in a second direction that is perpendicular to the first direction.

The removing of the first substrate and the plurality of elastic barriers may include separating the plurality of elastic barriers from the second substrate.

The resin layer formed on the second substrate may include a plurality of tilted cavities that are parallel to one another.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Example embodiments will now be described more fully with reference to the accompanying drawings. The same reference numerals in the drawings denote the same elements, and sizes of elements in the drawings may be exaggerated for clarity and convenience of explanation. Also, example embodiments are described, and various modifications may be made from the example embodiments.

The singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any combination of a plurality of related listed items or any of the plurality of related listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

When a first element is "on" or "over" a second element in a layer structure, it may include a case where the first element contacts the second element and is directly located on the top, bottom, left, or right of the second element, and a case where the first element does not contact the second element and is located on the top, bottom, left, or right of the second element with a one or more element therebetween.

Figure 1:
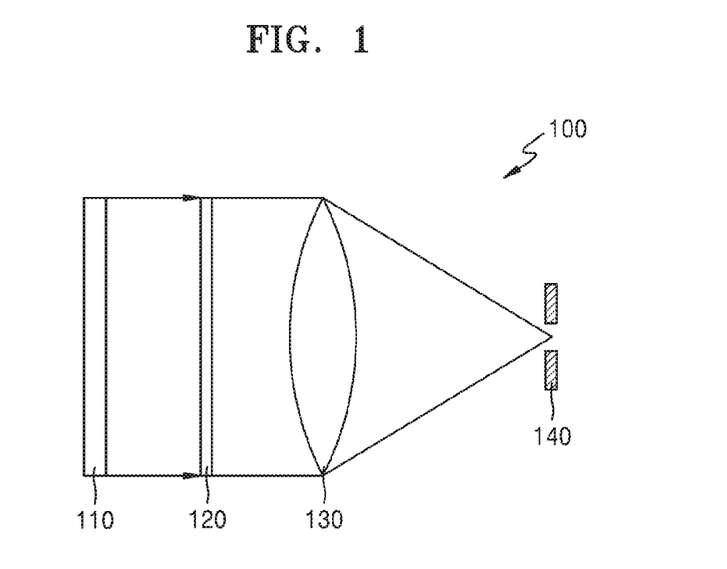
FIG. 1 is a cross-sectional view illustrating a configuration of a holographic display apparatus according to an example embodiment.

FIG. 1 is a cross-sectional view illustrating a configuration of a holographic display apparatus 100 according to an example embodiment. Referring to FIG. 1, the holographic display apparatus 100 according to an example embodiment may include a backlight unit 110 configured to provide illumination light, a spatial light modulator 120 configured to form a hologram pattern for reproducing a hologram image by modulating light incident from the backlight unit 110, a lens 130 configured to form the hologram image in a space by focusing light incident from the spatial light modulator 120, and a spatial filter 140 configured to transmit only the hologram image focused by the lens 130 therethrough.

The spatial light modulator 120 may form the hologram pattern for diffracting and modulating incident light according to a hologram signal applied from an image signal processor. The spatial light modulator 120 may be any one from among a phase modulator for performing only phase modulation, an amplitude modulator for performing only amplitude modulation, and a complex modulator for performing both phase modulation and amplitude modulation. Although the spatial light modulator 120 is a transmissive spatial light modulator in FIG. 1, the spatial light modulator 120 may be a reflective spatial light modulator. When the spatial light modulator 120 is a transmissive spatial light modulator, examples of the spatial light modulator 120 may include a semiconductor modulator based on a compound semiconductor such as gallium arsenide (GaAs) or a liquid crystal device (LCD). When the spatial light modulator 120 is a reflective spatial light modulator, examples of the spatial light modulator 120 may include a digital micromirror device (DMD), a liquid crystal on silicon (LCoS), and a semiconductor modulator.

Since the spatial light modulator 120 may include an array of pixels, the array of pixels may function as a pixel grating. Accordingly, light incident on the spatial light modulator 120 may be diffracted and interfere by the pixel grating including the array of pixels of the spatial light modulator 120 as well as the hologram pattern formed by the spatial light modulator 120. Also, part of the incident light may not be diffracted by the hologram pattern and may be directly transmitted through the spatial light modulator 120. As a result, not only the hologram image but also lattice spots may appear on a focal plane of the lens 130 where the hologram image is focused. The plurality of lattice spots may act as image noise that reduces the quality of the hologram image and make it uncomfortable for an observer to see the hologram image. Typically, in order to prevent or reduce the plurality of lattice spots from being seen by an observer, the hologram image may be reproduced by an off-axis method so the hologram image is prevented or reduced from overlapping with the plurality of lattice spots. In the off-axis method, the spatial filter 140 is located on the focal plane of the lens 130 and is configured to block the lattice spots and to transmit only the hologram image therethrough. Accordingly, the observer may see only the hologram image.

The backlight unit 110 may be configured to provide coherent homogenized illumination light to the spatial light modulator 120. In order to reduce or minimize the size of an optical system of the backlight unit 110, the backlight unit 110 may include a light guide plate. For example, FIG. 2 is a cross-sectional view illustrating a configuration of the backlight unit 110 according to an example embodiment.

Figure 2:
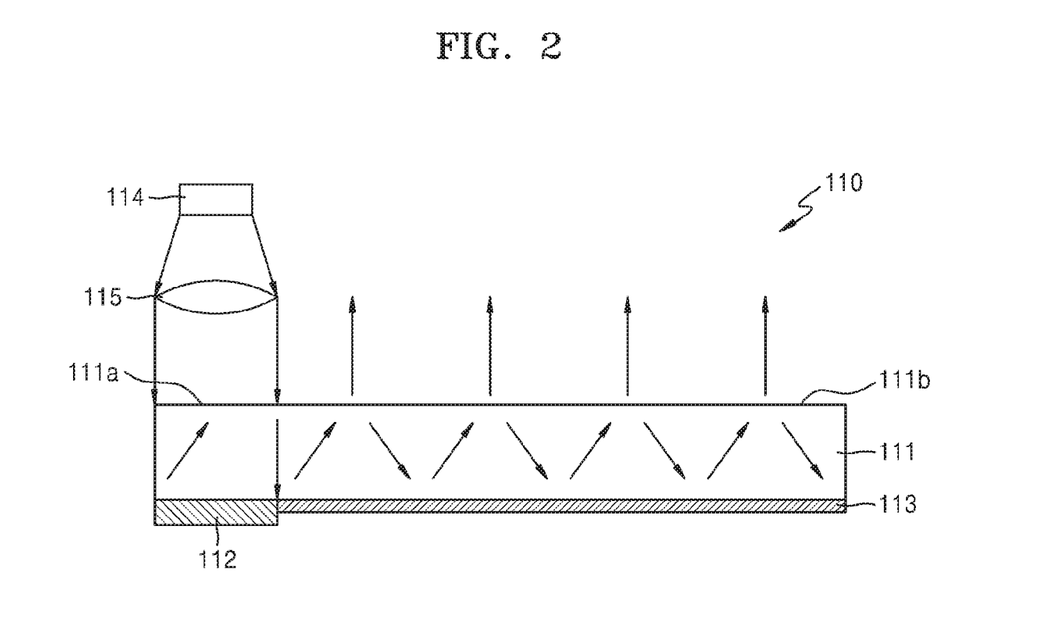
FIG. 2 is a cross-sectional view illustrating a configuration of a backlight unit according to an example embodiment.

Referring to FIG. 2, the backlight unit 110 may include a light source 114 configured to generate illumination light, a light guide plate 111 including a light incident surface 111a, on which the illumination light generated by the light source 114 is incident, and a light emission surface 111b through which the illumination light is emitted, an input coupler 112 configured to cause the illumination light incident on the light incident surface 111a of the light guide plate 111 to travel into the light guide plate 111, and an output coupler 113 configured to cause the illumination light to be emitted outward through the light emission surface 111b of the light guide plate 111. Also, the backlight unit 110 may further include a collimating lens 115 configured to convert the illumination light emitted from the light source 114 and incident on the input coupler 112 into parallel light. However, when the light source 114 generates collimated illumination light, the collimating lens 115 may be omitted.

The light source 114 may be a coherent light source configured to emit coherent light. In order to provide light having higher coherence, for example, a laser diode (LD) may be used as the light source 114. However, since light having some spatial coherence may be sufficiently diffracted and modulated by the spatial light modulator 120, for example, a light-emitting diode (LED) may also be used as the light source 114, but example embodiments are not limited thereto, and a light source emitting light having spatial coherence may be used as the light source 114. Also, although the light source 114 is illustrated as one block, the light source 114 may include an array of point light sources. For example, the light source 114 may include a plurality of red light-emitting lasers, a plurality of green light-emitting lasers, and a plurality of blue light-emitting lasers.

The light guide plate 111 may be formed of transparent glass or transparent plastic. For example, polymethyl methacrylate (PMMA) may be used as a material of the light guide plate 111. The light guide plate 111 may have a flat rectangular parallelepiped shape to function as a light waveguide for delivering light. Light incident on one end of the light guide plate 111 may be delivered to the opposite end without light loss through total internal reflection.

The input coupler 112 may be configured to cause light to be diffracted and obliquely travel into the light guide plate 111. In order to diffract light, the input coupler 112 may have a binary grating structure in which a plurality of parallel barriers are arranged with a constant grating period. For example, light perpendicularly incident on the input coupler 112 may be diffracted by the input coupler 112 and then may obliquely travel in the light guide plate 111 at an angle greater than a critical angle. The light may be repeatedly totally reflected by a top surface and a bottom surface of the light guide plate 111 and may travel in the light guide plate 111.

The output coupler 113 may be configured to cause light to be diffracted and emitted to the outside of the light guide plate 111. In order to diffract light, the output coupler 113 may have a binary grating structure in which a plurality of parallel barriers are arranged with a constant grating period. For example, the output coupler 113 may cause part of light obliquely incident on the output coupler 113 to be diffracted and travel in a perpendicular direction or in a direction at an angle less than the critical angle. The light incident at an angle less than the critical angle on the light emission surface 111b that is on the top surface of the light guide plate 111 may pass through the light emission surface 111b of the light guide plate 111 without being totally reflected. In this manner, light traveling in the light guide plate 111 may be homogenously emitted by the output coupler 113 to the outside of the light guide plate 111 through the light emission surface 111b of the light guide plate 111.

As shown in FIG. 2, the light incident surface 111a may be located on an edge portion of the top surface of the light guide plate 111, and the light emission surface 111b may be located on a remaining portion of the top surface of the light guide plate 111. The light source 114 and the collimating lens 115 may be located over the top surface of the light guide plate 111 to face the light incident surface 111a of the light guide plate 111. The input coupler 112 may be located on an edge portion of the bottom surface of the light guide plate 111 that is opposite to the top surface of the light guide plate 111 to face the light incident surface 111a of the light guide plate 111. The output coupler 113 may be located adjacent to the input coupler 112 on the bottom surface of the light guide plate 111 to face the light emission surface 111b of the light guide plate 111.

Illumination light collimated by the collimating lens 115 may be transmitted through the light incident surface 111a that is on the top surface of the light guide plate 111 and may be perpendicularly incident on the input coupler 112 that is on the bottom surface of the light guide plate 111. The illumination light perpendicularly incident on the input coupler 112 may be diffracted by the input coupler 112 and may obliquely travel to the top surface of the light guide plate 111. Next, the illumination light may be totally reflected by the top surface of the light guide plate 111 and may obliquely travel to the bottom surface of the light guide plate 111. Part of the illumination light may be totally reflected again by the bottom surface of the light guide plate 111 and may travel to the top surface of the light guide plate 111, and the other part of the illumination light may be diffracted by the output coupler 113 and may almost perpendicularly travel to the top surface of the light guide plate 111. The illumination light perpendicularly incident on the top surface of the light guide plate 111 may be emitted outward from the light guide plate 111 without being totally reflected. The illumination light emitted from the light guide plate 111 may be provided to the spatial light modulator 120.

In a backlight unit using a light guide plate, illumination light emitted from the light guide plate may not have uniform brightness and a bright/dark pattern having a stripe shape may be formed. In the backlight unit 110 according to an example embodiment, the input coupler 112 may have a tilted grating pattern in order to reduce or suppress a stripe pattern formed in illumination light emitted from the light guide plate 111. In other words, the plurality of barriers of the binary grating structure of the input coupler 112 may be tilted at a predetermined angle from a normal direction of the bottom surface of the light guide plate, and tilted from illumination light perpendicularly incident on the light incident surface 111a of the light guide plate 111.

Figure 3:
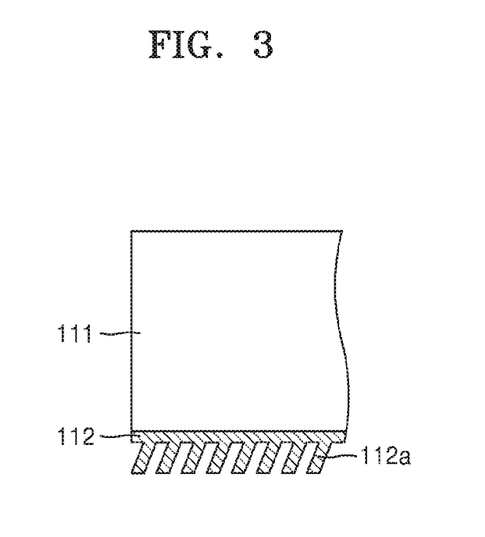
FIG. 3 is a cross-sectional view illustrating a structure of an input coupler according to an example embodiment.

For example, FIG. 3 is a cross-sectional view illustrating a structure of the input coupler 112 according to an example embodiment. Referring to FIG. 3, the input coupler 112 located on a bottom surface of the light guide plate 111 may include a plurality of barriers 112a that are arranged with a constant period. The plurality of barriers 112a of the input coupler 112 may be parallel to one another. Also, as shown in FIG. 3, each of the barriers 112a of the input coupler 112 may be tilted. In other words, each of the barriers 112a of the input coupler 112 may be located to have a predetermined angle from a normal direction of a surface of the input coupler 112. Accordingly, each of the barriers 112a of the input coupler 112 is tilted from an illumination angle perpendicularly incident on the light incident surface 111a of the light guide plate 111.

Figure 4:
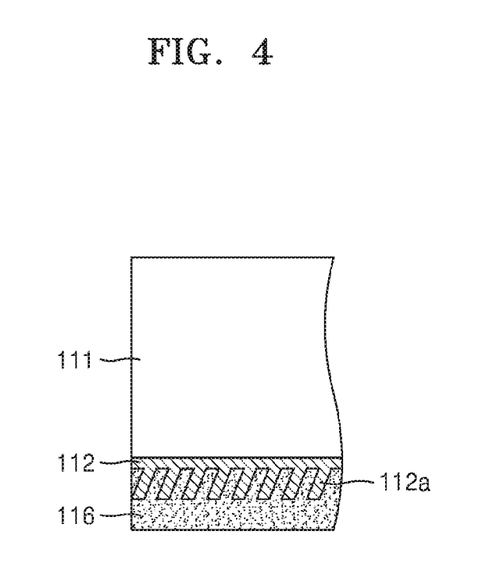
FIG. 4 is a cross-sectional view illustrating a structure of the input coupler according to an example embodiment.

FIG. 4 is a cross-sectional view illustrating a structure of the input coupler 112 according to an example embodiment. Referring to FIG. 4, in order to improve light use efficiency, a reflective layer 116 may be further provided to cover the input coupler 112. The reflective layer 116 may be formed of a metal material having high reflectance such as silver (Ag) or aluminum (Al). The reflective layer 116 may reduce light loss by reflecting illumination light that is transmitted through the input coupler 112 without being diffracted by the input coupler 112.

Figure 5:
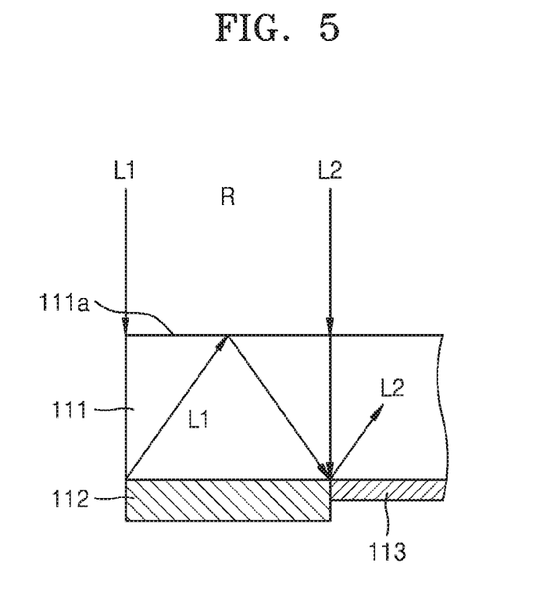
FIG. 5 illustrates an example path where light travels in the input coupler and a light guide plate when red light is incident on the light guide plate.
Figure 6:
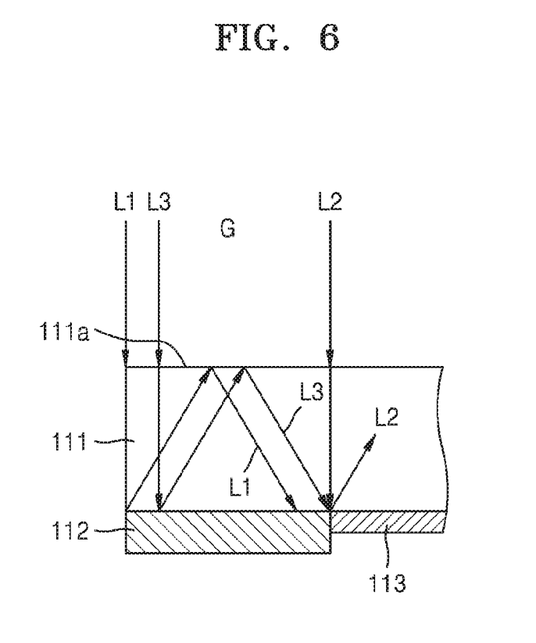
FIG. 6 illustrates an example path where light travels in the input coupler and the light guide plate when green light is incident on the light guide plate.
Figure 7:
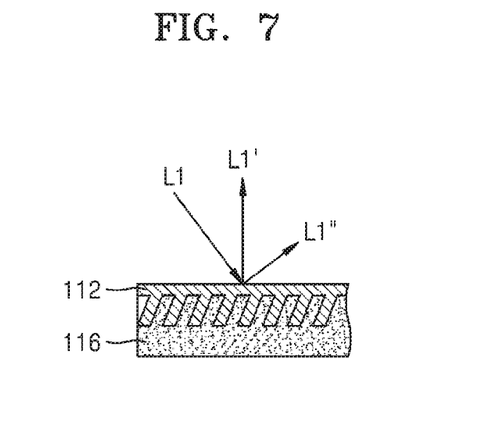
FIG. 7 illustrates an example diffraction direction in which light obliquely incident on the input coupler is diffracted.

FIG. 5, FIG. 6, and FIG. 7 are cross-sectional views for explaining an operation of the input coupler 112 according to an example embodiment. FIG. 5 illustrates an example path where light travels in the input coupler 112 and the light guide plate 111 when red light is incident on the light guide plate 111. FIG. 6 illustrates an example path where light travels in the input coupler 112 and the light guide plate 111 when green light is incident on the light guide plate 111. As described above, the light source 114 may include a plurality of red light-emitting lasers, a plurality of green light-emitting lasers, and a plurality of blue light-emitting lasers. Accordingly, illumination light may include red light, green light, and blue light. A diffraction angle at which the illumination light is diffracted by the input coupler 112 is determined by a grating period of the input coupler 112 and a wavelength of the illumination light, and thus diffraction angles of light components of the illumination light having different wavelength bands at which the light components are diffracted by the input coupler 112 are different. Accordingly, the grating period of the input coupler 112 may be determined considering diffraction characteristics of the input coupler 112 according to wavelengths of light components of the illumination light.

For example, referring to FIG. 5, red light R is almost uniformly incident on the light incident surface 111a of the light guide plate 111. In FIG. 5, only a first light beam L1 and a second light beam L2 incident on both edges of the light incident surface 111a from among light beams of the red light R are illustrated as an example. The second light beam L2 is incident on one edge of the input coupler 112 adjacent to the output coupler 113, and then is diffracted by the input coupler 112 and obliquely travels into the light guide plate 111. In this case, the second light beam L2 diffracted away from and not incident on a portion facing the light incident surface 111a. The first light beam L1 incident on the other edge of the light guide plate 111 is diffracted by the input coupler 112, and then is incident on a central portion of the light incident surface 111a. Next, the first light source L1 may be totally reflected by the light incident surface 111a and may be incident on a boundary between the output coupler 113 and the input coupler 112. Accordingly, even when part of the red light R diffracted by the input coupler 112 is incident again on the light incident surface 111a, light beams of the red light R do not overlap one another in the light guide plate 111. Accordingly, bright stripes formed when light beams partially overlap in the light guide plate 111 may not be formed for the red light R.

A grating period of the input coupler 112 may be selected, for example, so the red light R that is diffracted by the input coupler 112 is incident on a top surface of the light guide plate 111, totally reflected by the top surface of the light guide plate 111, and travels to a bottom surface of the light guide plate 111 not incident again on the input coupler 112. In more detail, as shown in FIG. 5, the grating period of the input coupler 112 may be selected so that the first light beam L1 of the red light R incident on an edge of the light guide plate 111 is diffracted by the input coupler 112 and is incident on the center of the light incident surface 111a. In this case, since the first light beam L1 of the red light R is incident on the boundary between the output coupler 113 and the input coupler 112, light beams of the red light R that overlap in the light guide plate 111 may be reduced or minimized.

Referring to FIG. 6, for example, green light G is almost uniformly incident on the light incident surface 111a of the light guide plate 111. In FIG. 6, only a first light beam L1 and a second light beam L2 incident on both edges of the light incident surface 111a and a third light beam L3 incident on an inner portion of the light incident surface 111a from among light beams of the green light G are illustrated as an example. The second light beam L2 is incident on one edge of the input coupler 112 adjacent to the output coupler 113, and then is diffracted by the input coupler 112 and obliquely travels into the light guide plate 111. In this case, like in the red light R, the second light beam L2 of the green light G is diffracted away from and not incident on a portion facing the light incident surface 111a.

The first light beam L1 of the green light G incident on the other edge of the light guide plate 111 is diffracted by the input coupler 112, and then is incident on the inner portion of the light incident surface 111a. Since the green light G has a wavelength shorter than that of the red light R, a diffraction angle of the green light G by the input coupler 112 is less than a diffraction angle of the red light R. Accordingly, the first light beam L1 totally reflected by the light incident surface 111a may be incident again on the input coupler 112. Also, the third light beam L3 between the first light beam L1 and the second light beam L2 is diffracted by the input coupler 112, and then is incident on the inner portion of the light incident surface 111a. Next, the third light beam L3 may be totally reflected by the light incident surface 111a and is incident on a boundary between the output coupler 113 and the input coupler 112.

Accordingly, light beams of the green light G between the first light beam L1 and the third light beam L3 may be diffracted by the input coupler 112, and then may be totally reflected by the light incident surface 111a and be incident again on the input coupler 112. When the light beams incident again on the input coupler 112 are diffracted again by the input coupler 112 and travel into the light guide plate 111, some of the light beams of the green light G may overlap with one another in the light guide plate 111, thereby causing bright stripes. However, in an example embodiment, since each of the barriers 112a of the input coupler 112 is tilted, bright stripes may be reduced or minimized.

For example, FIG. 7 illustrates an example diffraction direction in which light obliquely incident on the input coupler 112 is diffracted. Light directly input from the light source 114 through the light incident surface 111a is perpendicularly incident on the input coupler 112. As shown in FIG. 5 and FIG. 6, the input coupler 112 may cause the light perpendicularly incident on the input coupler 112 to be diffracted and obliquely travel with respect to the input coupler 112. Accordingly, the light directly input from the light source 114 may be diffracted by the input coupler 112 and may travel into the light guide plate 111. In contrast, light totally reflected by the light incident surface 111a and incident for the second time on the input coupler 112 is obliquely incident on the input coupler 112. Since each of the barriers 112a of the input coupler 112 is tilted, as shown in FIG. 7, most light L1' of the first light beam L1 obliquely incident on the input coupler 112 may be diffracted by the input coupler 112 and may travel in a direction at an angle less than a critical angle, for example, a direction perpendicular to the input coupler 112 or a direction opposite to a direction in which light travels in the light guide plate 111. In this case, a higher portion of light L1' of the first light beam L1 may pass through the light incident surface 111a of the light guide plate 111 and may be emitted to the outside of the light guide plate 111. A lower portion of light L1" of the first light beam L1 obliquely incident on the input coupler 112 may be high-order diffracted and may travel into the light guide plate 111.

According to an example embodiment, since light in a shorter wavelength band incident for the second time on the input coupler 112 may be mostly emitted to the outside of the light guide plate 111 through the light incident surface 111a, a bright stripe pattern formed in a shorter wavelength band when light beams overlap with one another in the light guide plate 111 may be reduced. Also, as shown in FIG. 5, when the input coupler 112 is designed so that the first light beam L1 of the red light R having a longest wavelength band from among pieces of light provided from the light source 114 is totally reflected by the light incident surface 111a and then is incident on a boundary between the output coupler 113 and the input coupler 112, a dark stripe pattern formed when light is not emitted from a portion of the light guide plate 111 may be prevented or reduced from being formed in a longer wavelength band.

Figure 8:
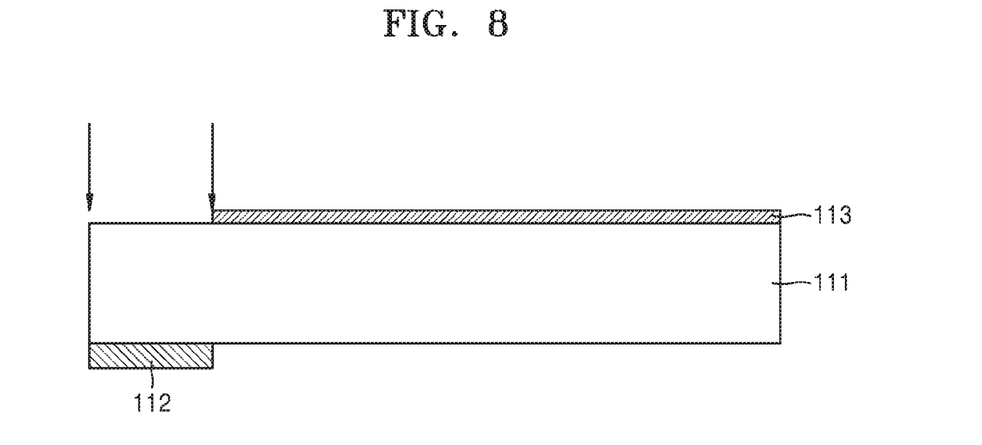
FIGS. 8, 9, 10, and 11 are cross-sectional views each illustrating a configuration of the backlight unit according to example embodiments.
Figure 9:
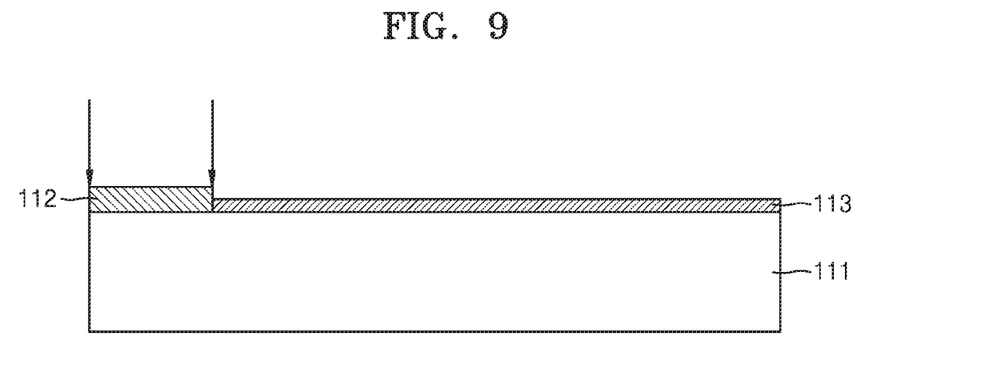
Figure 10:
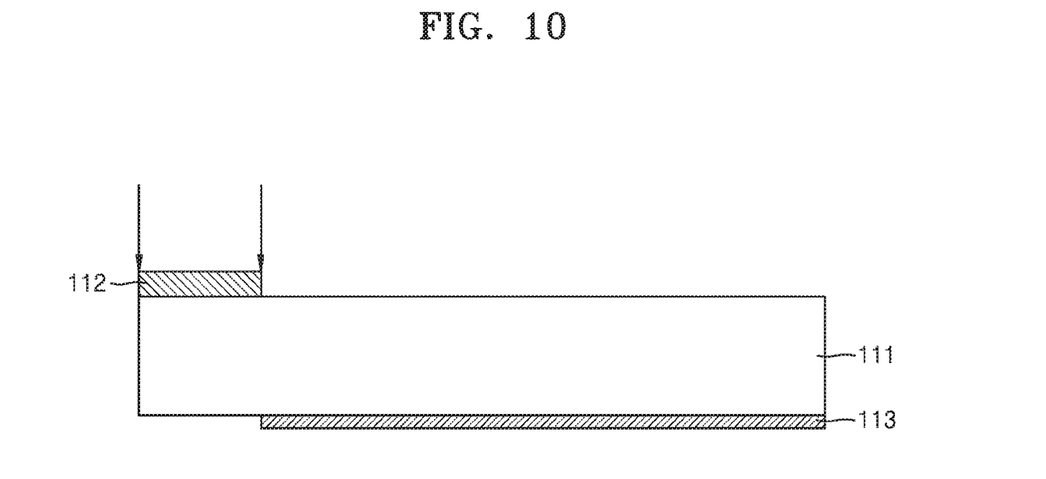
Figure 11:
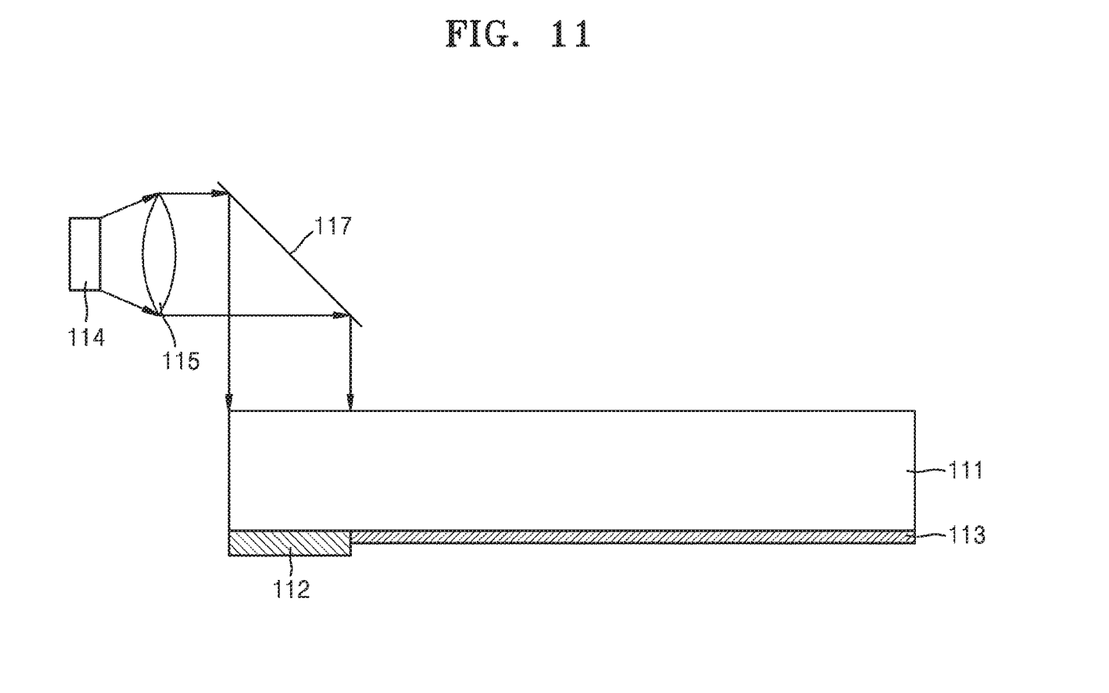

Although both the input coupler 112 and the output coupler 113 are located on a bottom surface of the light guide plate 111, example embodiments are not limited thereto. For example, FIG. 8, FIG. 9, FIG. 10, and FIG. 11 are cross-sectional views each illustrating a configuration of the backlight unit 110 according to an example embodiment. First, as shown in FIG. 8, the input coupler 112 may be located on the bottom surface of the light guide plate 111, and the output coupler 113 may be located on the top surface of the light guide plate 111. Also, as shown in FIG. 9, both the input coupler 112 and the output coupler 113 may be located on the top surface of the light guide plate 111. Also, as shown in FIG. 10, the input coupler 112 may be located on the top surface of the light guide plate 111 and the output coupler 113 may be located on the bottom surface of the light guide plate 111.

Also, the light source 114 and the collimating lens 115 may not directly face the light incident surface 111a. For example, referring to FIG. 11, a mirror 117 may be located to face the light incident surface 111a, and the light source 114 and the collimating lens 115 may be located at an edge of the light guide plate 111 and may be arranged in a horizontal direction. Illumination light provided from the light source 114 and the collimating lens 115 may be reflected by the mirror 117 and may be perpendicularly incident on the light incident surface 111a.

FIG. 12A, FIG. 12B, FIG. 12C, FIG. 12D, FIG. 12E, and FIG. 12F are perspective views for explaining a process of manufacturing the input coupler 112 according to an example embodiment.

Figure 12A:
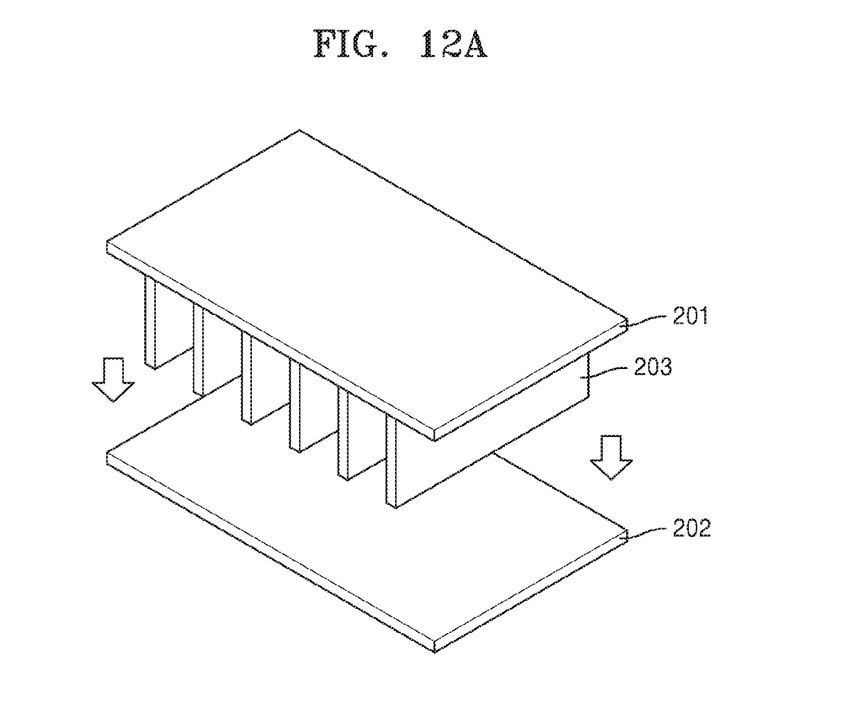
FIGS. 12A, 12B, 12C, 12D, 12E, and 12F are perspective views for explaining a process of manufacturing the input coupler according to an example embodiment.

First, referring to FIG. 12A, a plurality of elastic barriers 203 parallel to one another and perpendicularly located on a first substrate 201 are prepared. For example, each of the first substrate 201 and the elastic barriers 203 may be formed of an elastic material such as polydimethyl-siloxane (PDMS) resin or silicon resin. The plurality of elastic barriers 203 may be formed by entirely applying the elastic material on the first substrate 201 and performing etching. Each of the elastic barriers 203 may have a flat plate shape with a larger width and a smaller thickness, and may have a thickness of, for example, about 30 μm.

Next, the plurality of elastic barriers 203 may be temporarily adhered to a second substrate 202. For example, the second substrate 202 may also be formed of an elastic material such as PDMS resin or silicon resin. For temporary adhesion, surface treatment, for example, oxygen ($O_2$) plasma surface treatment, may be performed on a surface of the second substrate 202. After the surface treatment is performed on the second surface 202, when the plurality of elastic barriers 203 are brought into contact with the surface-treated surface of the second substrate 202, the second substrate 202 may be naturally adhered to the plurality of elastic barriers 203. Accordingly, a first end portion of each of the elastic barriers 203 may contact the first substrate 201 and a second end portion of each of the elastic barriers 203 may contact the second substrate 202.

Figure 12B:
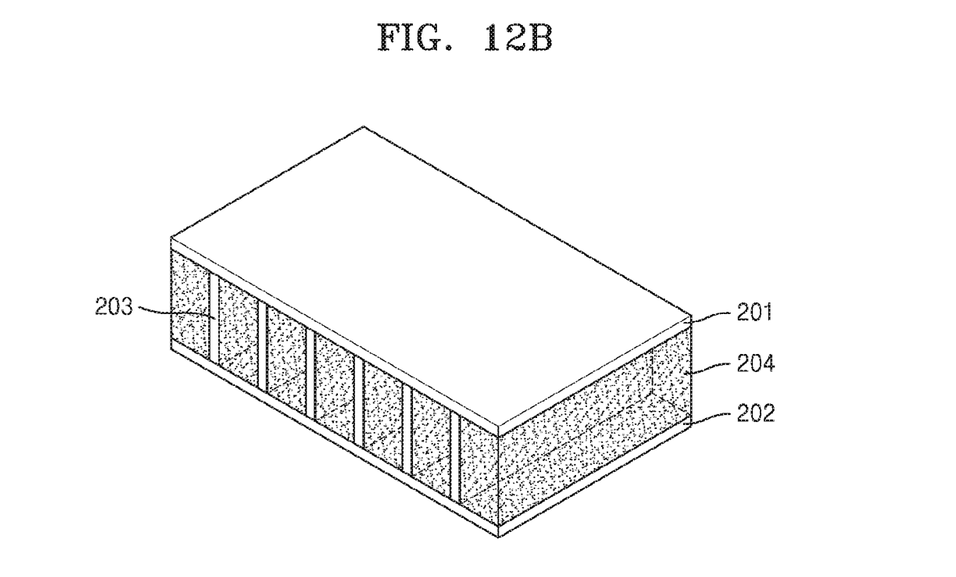

Referring to FIG. 12B, a thermosetting or photocurable resin 204 may be filled between the first substrate 201 and the second substrate 202. For example, the thermosetting or photocurable resin 204 may be completely filled between the plurality of elastic barriers 203 located between the first substrate 201 and the second substrate 202.

Figure 12C:
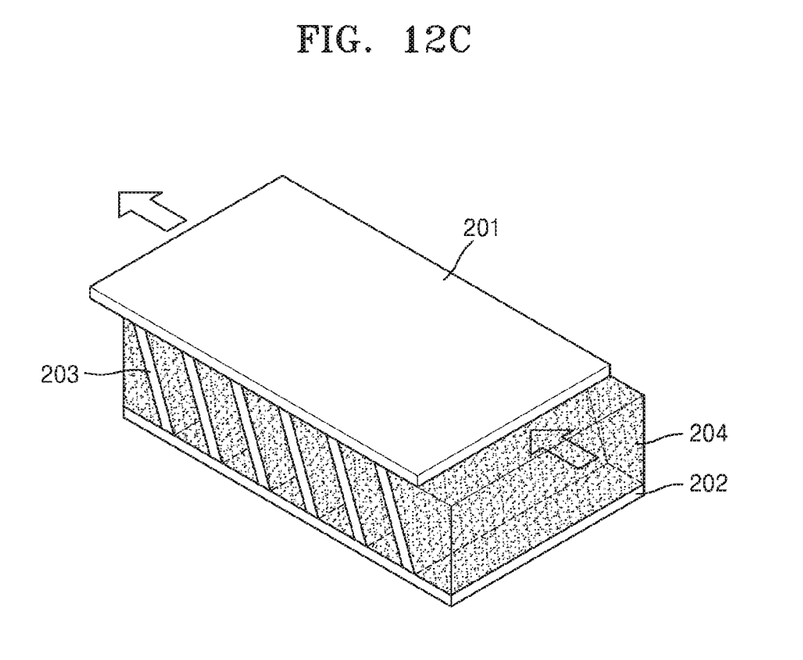

Also, referring to FIG. 12C, the first substrate 201 and the second substrate 202 may be displaced with respect to each other. For example, the first substrate 201 and the second substrate 202 may be displaced with respect to each other in a direction perpendicular to a direction in which each of the plurality of elastic barriers 203 is oriented, or a direction perpendicular to a width direction of the elastic barriers 203. Since the first end portion of each of the plurality of elastic barriers 203 is moved along with the first substrate 201 displaced and the second end portion of each of the plurality of elastic barriers 203 is moved along with the second substrate 202 displaced, the plurality of elastic barriers 203 are tilted from normal direction of surfaces of the first substrate 201 and the second substrate 202. Since each of the first substrate 201, the second substrate 202, and the elastic barriers 203 is formed of an elastic material, the elastic barriers 203 may not be damaged in this process.

Figure 12D:
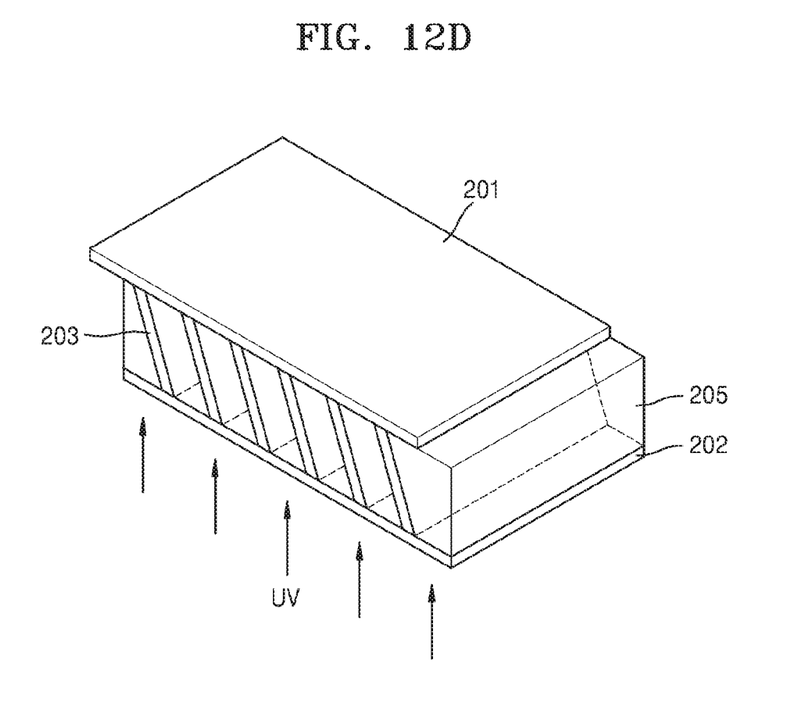

Next, referring to FIG. 12D, the thermosetting or photocurable resin 204 may be cured by applying heat or light (e.g., ultraviolet rays) to the thermosetting or photocurable resin 204. The thermosetting or photocurable resin 204 may be cured to form a resin layer 205, and the plurality of elastic barriers 203 may be obliquely fixed in the resin layer 205.

Figure 12E:
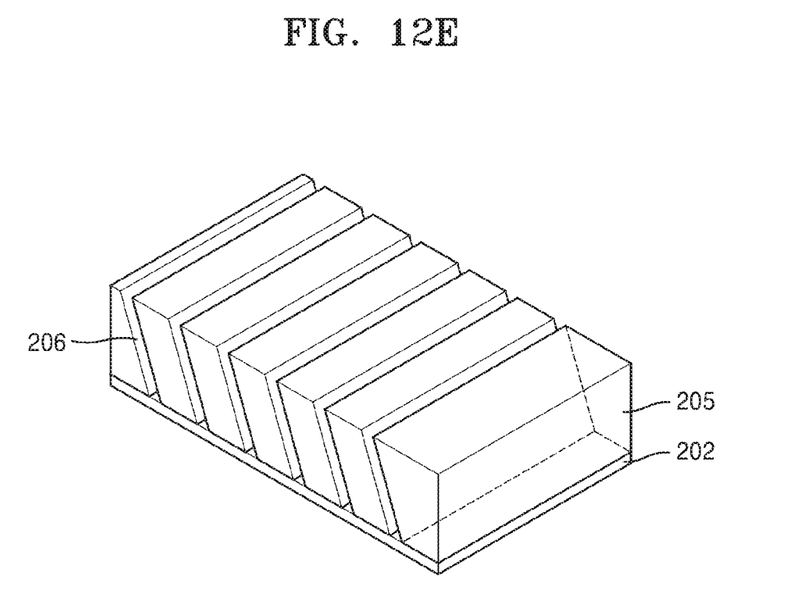

Referring to FIG. 12E, the first substrate 201 and the plurality of elastic barriers 203 may be removed. Since the adhesion of the elastic barriers 203 through the surface treatment of FIG. 12A is not permanent, the first substrate 201 and the plurality of elastic barriers 203 may be easily separated from the second substrate 202 by applying a physical force. Once the first substrate 201 and the plurality of elastic barriers 203 are removed, a plurality of parallel tilted cavities 206, instead of the elastic barriers 203, may be formed in the resin layer 205. The second substrate 202 and the resin layer 205 may function as a master mold for manufacturing the input coupler 112.

Figure 12F:
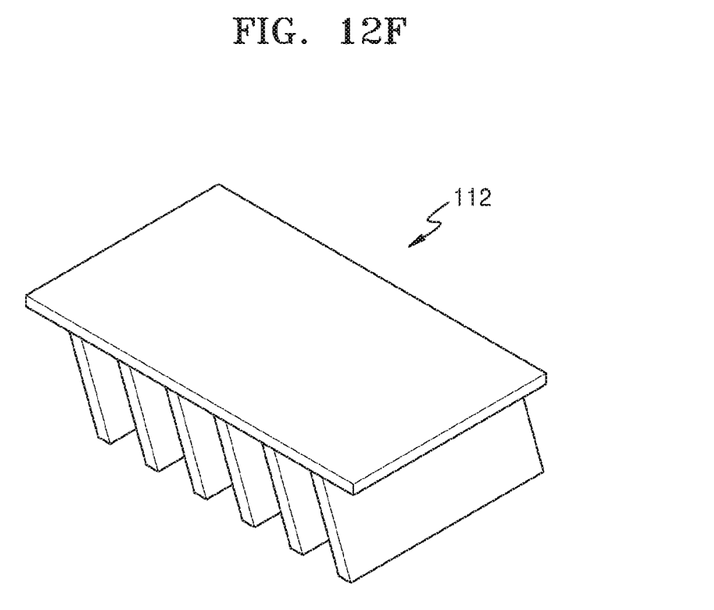

For example, referring to FIG. 12F, when a thermosetting or photocurable resin is applied to the resin layer 205, is cured, and then is separated, the input coupler 112 including a plurality of tilted barriers that are parallel to one another may be formed. Accordingly, the input coupler 112 may be mass-replicated by using the master mold including the second substrate 202 and the resin layer 205 of FIG. 12E.

While a backlight unit including an input coupler, a holographic display apparatus including the backlight unit, and a method of manufacturing the input coupler according to the present disclosure have been shown and described with reference to example embodiments thereof, the example embodiments and terms have merely been used to explain the present disclosure and should not be construed as limiting the scope of the present disclosure as defined by the appended claims. The example embodiments should be considered in a descriptive sense only and not for purposes of limitation. Therefore, the scope of the present disclosure is defined not by the detailed description of the present disclosure but by the appended claims, and all differences within the scope will be construed as being included in the present disclosure.

What is claimed is:

1. A backlight unit comprising:
   a light source configured to generate light;
   a light guide plate comprising a light incident surface on which the light generated by the light source is incident and a light emission surface through which the light incident on the light incident surface of the light guide plate is emitted;
   an input coupler configured to cause the light incident on the light incident surface of the light guide plate to travel into the light guide plate; and
   an output coupler configured to emit the light traveling in the light guide plate outward through the light emission surface of the light guide plate,
   wherein the input coupler comprises a binary grating structure in which a plurality of barriers are arranged parallel to one another at a constant grating period, and the plurality of barriers are tilted from a direction of the light incident on the light incident surface of the light guide plate,
   wherein the light guide plate further comprises a first surface and a second surface that is opposite to the first surface,
   wherein the input coupler is provided on an edge portion of the first surface of the light guide plate and is further configured to diffract the light incident on the input coupler to obliquely travel to the second surface of the light guide plate,
   wherein the light comprises light having a first wavelength band and light having a second wavelength band that is shorter than the first wavelength band, and
   wherein the constant grating period of the input coupler is set so the light having the first wavelength band that is diffracted by the input coupler is incident on the second surface of the light guide plate, is totally reflected by the second surface of the light guide plate, and travels to the first surface of the light guide plate and is not incident again on the input coupler.

2. The backlight unit of claim 1, wherein the input coupler is further configured to cause light perpendicularly incident on the input coupler to be diffracted and to obliquely travel with respect to the input coupler, and to cause light obliquely incident on the input coupler to be diffracted and travel in a direction perpendicular to the input coupler or a direction opposite to a direction in which light travels in the light guide plate.

3. The backlight unit of claim 1, wherein the constant grating period of the input coupler is set so a portion of the light having the second wavelength band that is diffracted by the input coupler is incident on the second surface of the light guide plate, is totally reflected by the second surface of the light guide plate, and travels to the first surface of the light guide plate and is incident again on the input coupler.

4. The backlight unit of claim 1, wherein the output coupler is provided adjacent to the input coupler on the first surface of the light guide plate.

5. The backlight unit of claim 1, wherein the output coupler is provided on the second surface of the light guide plate.

6. The backlight unit of claim 1, further comprising a collimating lens configured to collimate the light that is emitted from the light source and is incident on the input coupler into parallel light.

7. The backlight unit of claim 1, further comprising a reflective layer provided on the input coupler.

8. A holographic display apparatus comprising:
a backlight unit; and
a spatial light modulator configured to modulate light provided by the backlight unit and form a holographic image,
wherein the backlight unit comprises:
a light source configured to generate the light;
a light guide plate comprising a light incident surface on which the light generated by the light source is incident and a light emission surface through which the light incident on the light incident surface of the light guide plate is emitted;
an input coupler configured to cause the light incident on the light incident surface of the light guide plate to travel into the light guide plate; and
an output coupler configured to emit the light traveling in the light guide plate outward through the light emission surface of the light guide plate,
wherein the input coupler has a binary grating structure in which a plurality of barriers are arranged parallel to one another at a constant grating period, and the plurality of barriers are tilted from a direction of the light incident on the light incident surface of the light guide plate,
wherein the light guide plate further comprises a first surface and a second surface that is opposite to the first surface,
wherein the input coupler is located on an edge portion of the first surface of the light guide plate and is further configured to diffract the light incident on the input coupler to obliquely travel to the second surface of the light guide plate,
wherein the light comprises light having a first wavelength band and light having a second wavelength band that is shorter than the first wavelength band, and
wherein the constant grating period of the input coupler is set so the light having the first wavelength band that is diffracted by the input coupler is incident on the second surface of the light guide plate, is totally reflected by the second surface of the light guide plate, and travels to the first surface of the light guide plate and is not incident again on the input coupler.

9. The holographic display apparatus of claim 8, wherein the input coupler is further configured to cause light perpendicularly incident on the input coupler to be diffracted and to obliquely travel with respect to the input coupler, and to cause light obliquely incident on the input coupler to be diffracted and to travel in one of a direction perpendicular to the input coupler or a direction opposite to a direction in which light travels in the light guide plate.

10. The holographic display apparatus of claim 8, wherein the constant grating period of the input coupler is set so a portion of the light having the second wavelength band that is diffracted by the input coupler is incident on the second surface of the light guide plate, is totally reflected by the second surface of the light guide plate, and travels to the first surface of the light guide plate and is incident again on the input coupler.

11. The holographic display apparatus of claim 8, wherein the output coupler is provided adjacent to the input coupler on the first surface of the light guide plate.

12. The holographic display apparatus of claim 8, wherein the backlight unit further comprises a reflective layer provided on the input coupler.

13. A method of manufacturing an input coupler, the method comprising:
preparing a plurality of elastic barriers that are parallel to one another and are perpendicularly provided on a first substrate;
temporarily adhering the plurality of elastic barriers to a second substrate;
filling a thermosetting or photocurable resin between the plurality of elastic barriers provided between the first substrate and the second substrate;
tilting the plurality of elastic barriers by displacing the first substrate and the second substrate with respect to each other;
forming a resin layer by curing the thermosetting or photocurable resin by applying heat or light to the thermosetting or photocurable resin;
manufacturing a master mold comprising the second substrate and the resin layer by removing the first substrate and the plurality of elastic barriers; and
replicating the input coupler by using the master mold,
wherein the input coupler has a binary grating structure in which a plurality of tilted barriers that are arranged parallel to one another at a constant grating period.

14. The method of claim 13, wherein the temporary adhering of the plurality of elastic barriers to the second substrate comprises:
performing oxygen ($O_2$) plasma surface treatment on a surface of the second substrate; and
adhering the plurality of elastic barriers to be in contact with the $O_2$ plasma surface-treated surface of the second substrate.

15. The method of claim 13, wherein each of the plurality of elastic barriers is oriented in a first direction, and
wherein the displacing of the first substrate and the second substrate with respect to each other comprises moving the first substrate or the second substrate in a second direction that is perpendicular to the first direction.

16. The method of claim 13, wherein the removing of the first substrate and the plurality of elastic barriers comprises separating the plurality of elastic barriers from the second substrate.

17. The method of claim 13, wherein the resin layer formed on the second substrate comprises a plurality of tilted cavities that are parallel to one another.

* * * * *